United States Patent
Jeong

(10) Patent No.: US 10,247,912 B2
(45) Date of Patent: Apr. 2, 2019

(54) IMAGE PICKUP LENS AND CAMERA MODULE INCLUDING THE SAME

(71) Applicant: LG INNOTEK CO., LTD., Seoul (KR)

(72) Inventor: Hye Jung Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/753,906

(22) Filed: Jun. 29, 2015

(65) Prior Publication Data

US 2016/0004035 A1   Jan. 7, 2016

(30) Foreign Application Priority Data

Jul. 3, 2014   (KR) .......................... 10-2014-0083048

(51) Int. Cl.
*G02B 9/62*   (2006.01)
*G02B 13/00*   (2006.01)
*H04N 5/225*   (2006.01)

(52) U.S. Cl.
CPC ........... *G02B 9/62* (2013.01); *G02B 13/0045* (2013.01); *H04N 5/2254* (2013.01)

(58) Field of Classification Search
CPC ..... G02B 9/62; G02B 13/0045; H04N 5/2254
USPC ........................................ 359/713, 756, 757
See application file for complete search history.

(56) References Cited

U.S. PATENT DOCUMENTS

| 2012/0188654 A1* | 7/2012 | Huang ..................... G02B 9/62 359/713 |
| 2014/0063618 A1* | 3/2014 | Park ........................ G02B 13/18 359/713 |
| 2014/0153113 A1* | 6/2014 | Tsai ......................... G02B 13/18 359/713 |
| 2014/0153117 A1 | 6/2014 | Hagiwara |
| 2014/0293458 A1* | 10/2014 | Nabeta ............... G02B 13/0045 359/759 |

FOREIGN PATENT DOCUMENTS

| CN | 202217102 U | 5/2012 |
| CN | 202256850 U | 5/2012 |
| CN | 103676108 A | 3/2014 |
| CN | 103852858 A | 6/2014 |
| EP | 2708929 | * 9/2013 ............. G02B 13/00 |
| JP | WO2012/008357 | * 1/2012 ............. G02B 13/18 |
| KR | 1020120135648 A | 12/2012 |
| WO | WO-2008/142808 A1 | 11/2008 |

OTHER PUBLICATIONS

Office Action dated Sep. 25, 2018 in Chinese Application No. 201510379905.9, along with its English translation.

* cited by examiner

*Primary Examiner* — Alicia M Harrington
(74) *Attorney, Agent, or Firm* — Saliwanchik, Lloyd & Eisenschenk

(57) ABSTRACT

Embodiments provide an image pickup lens including a first lens to a sixth lens arranged in sequence from an object side to an image side. A first surface of the third lens facing the object side has a radius of curvature greater than a radius of curvature of a second surface of the third lens facing the image side. A combined focal distance of the fourth lens and the fifth lens is greater than 1 and less than 3. The fourth lens and the fifth lens each have an index of refraction of below 1.7. An image surface of the sixth lens has a point of inflection.

14 Claims, 8 Drawing Sheets

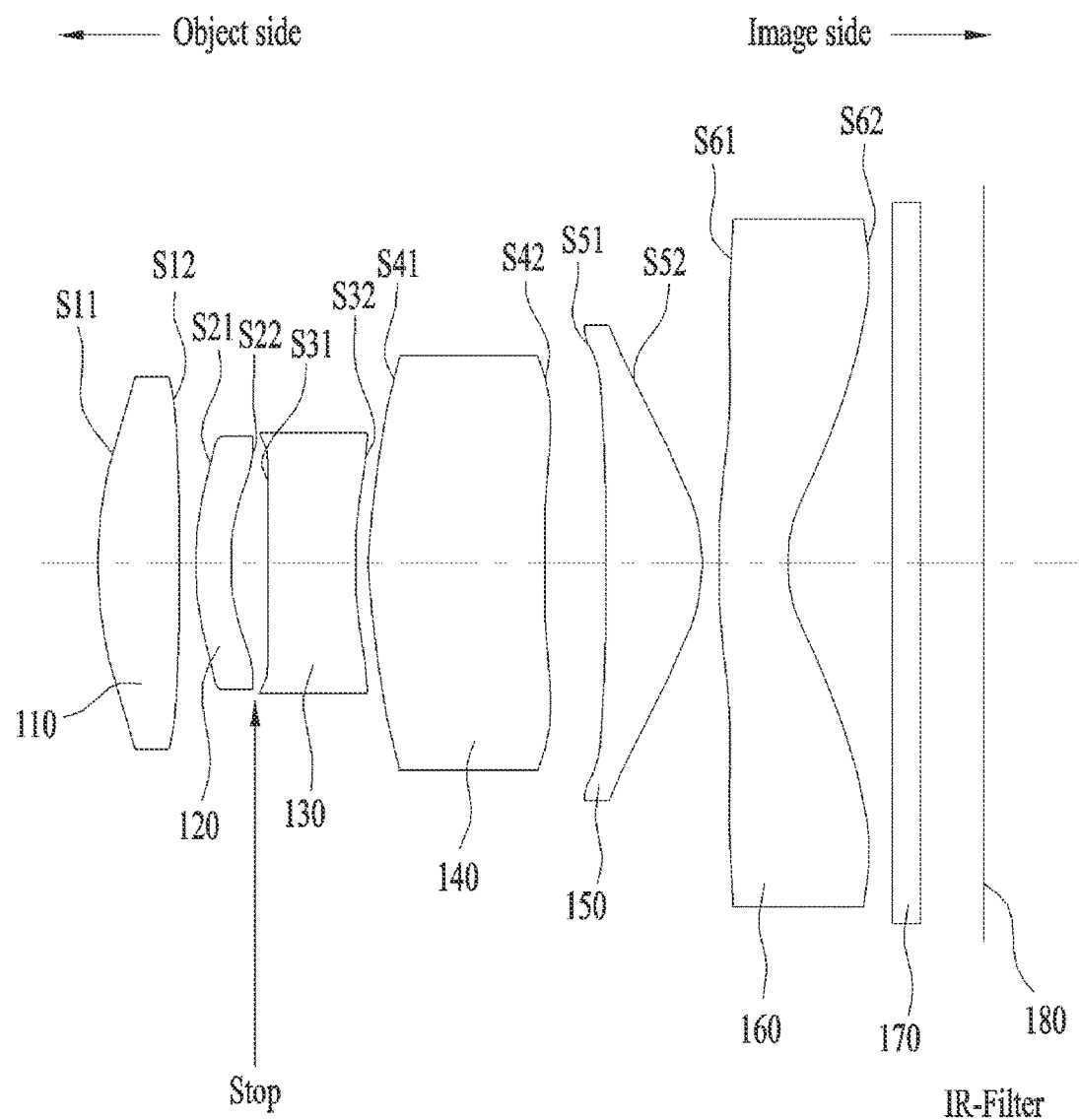
[Fig. 1]

[Fig. 2]
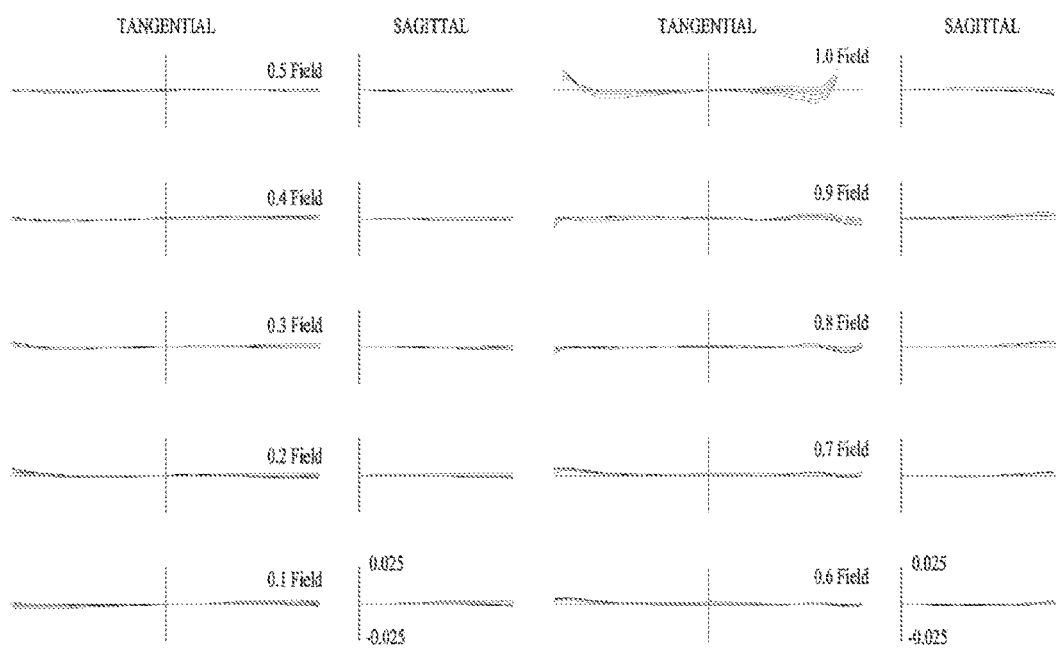
[Fig. 3]
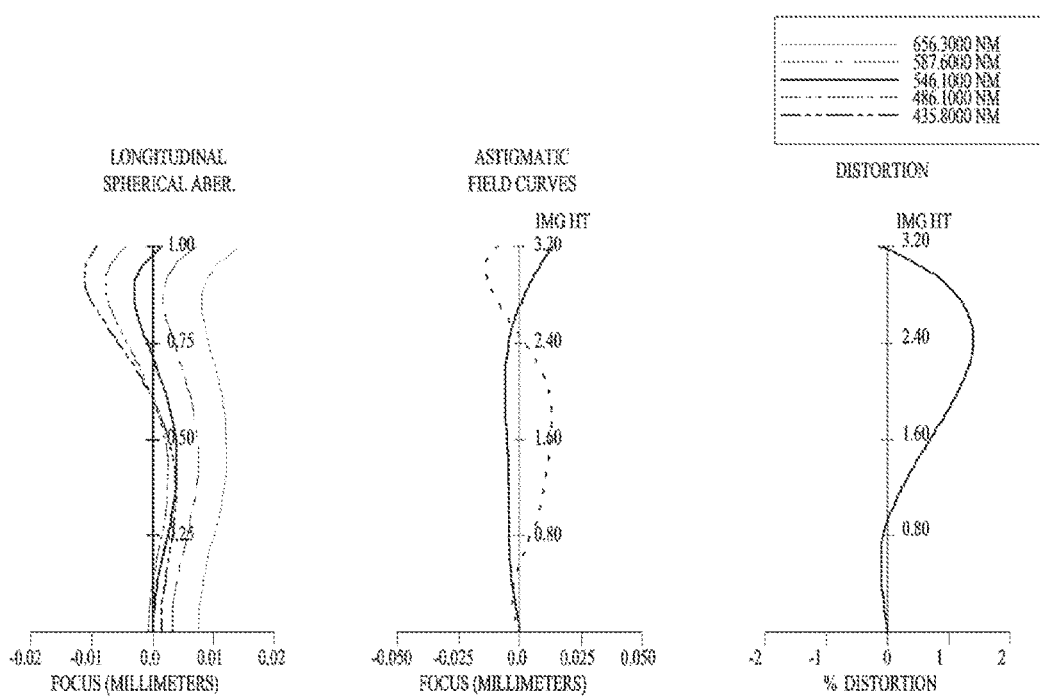

【Fig. 4】
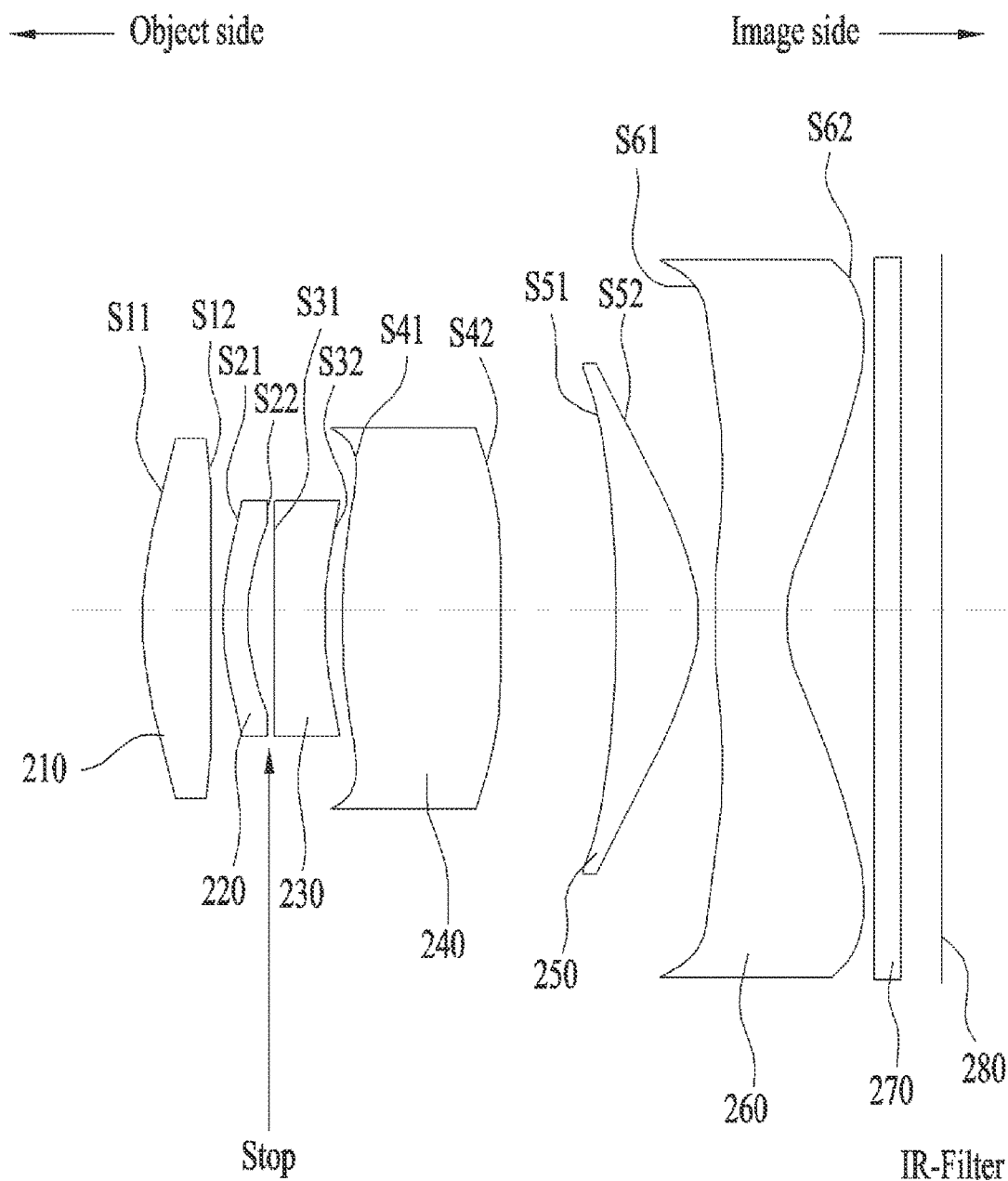

[Fig. 5]
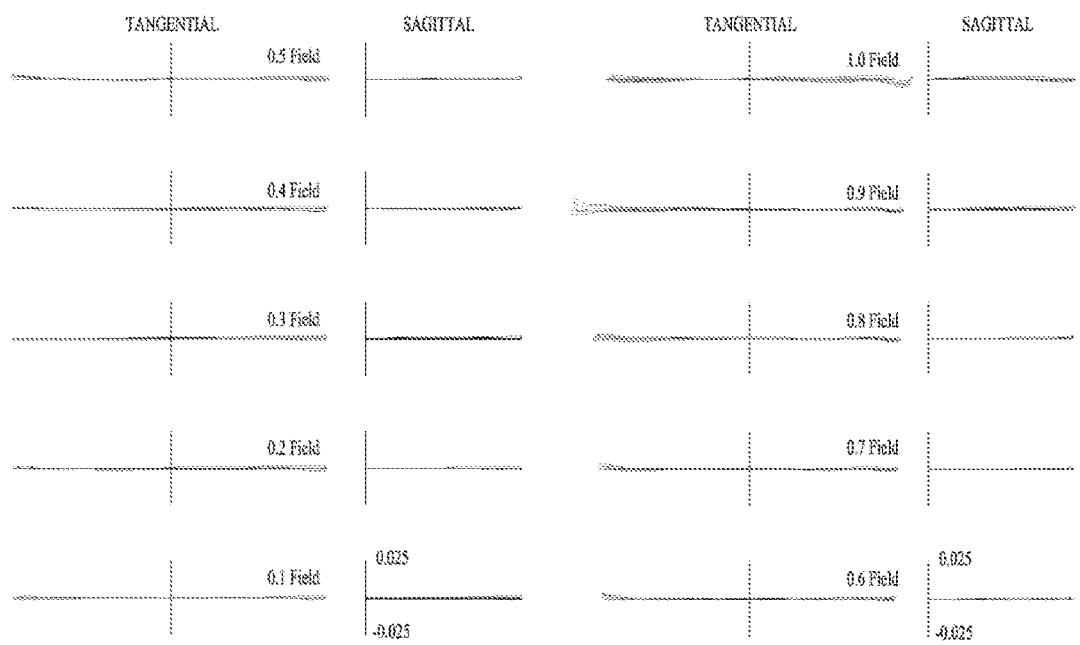
[Fig. 6]
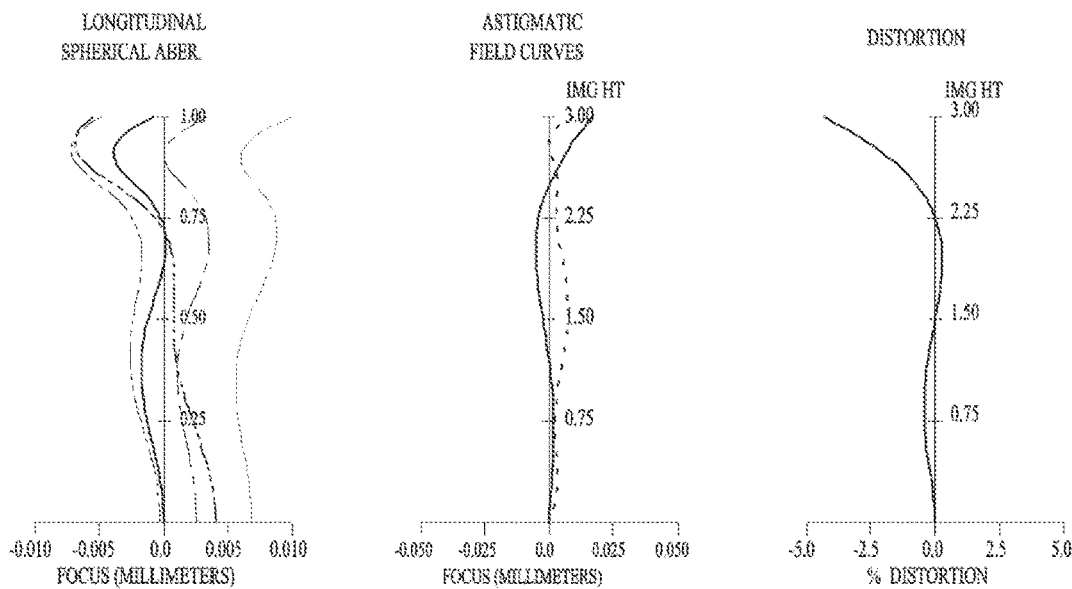

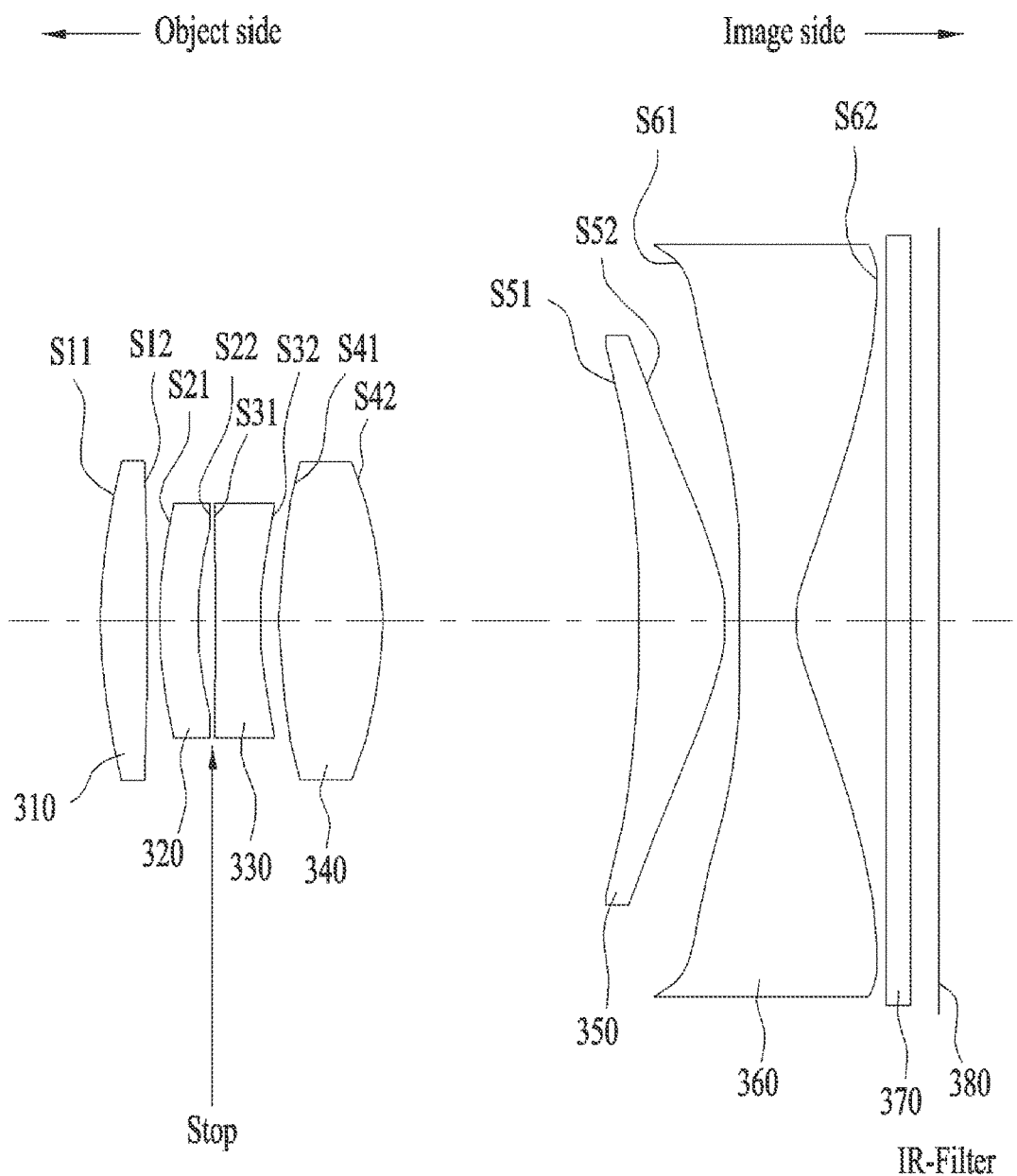
[Fig. 7]

[Fig. 8]
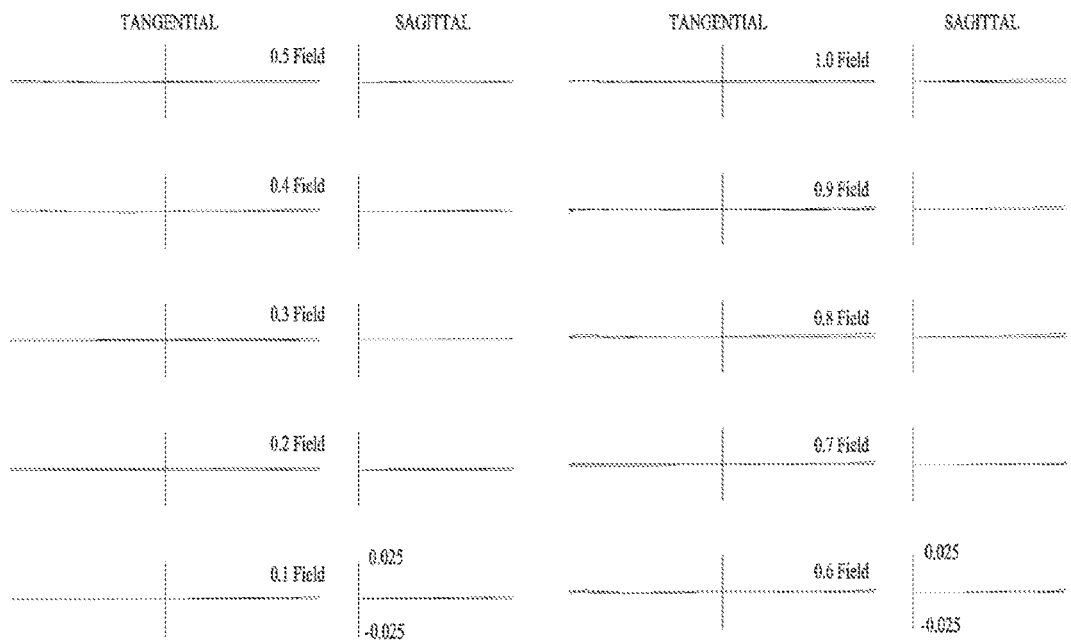
[Fig. 9]
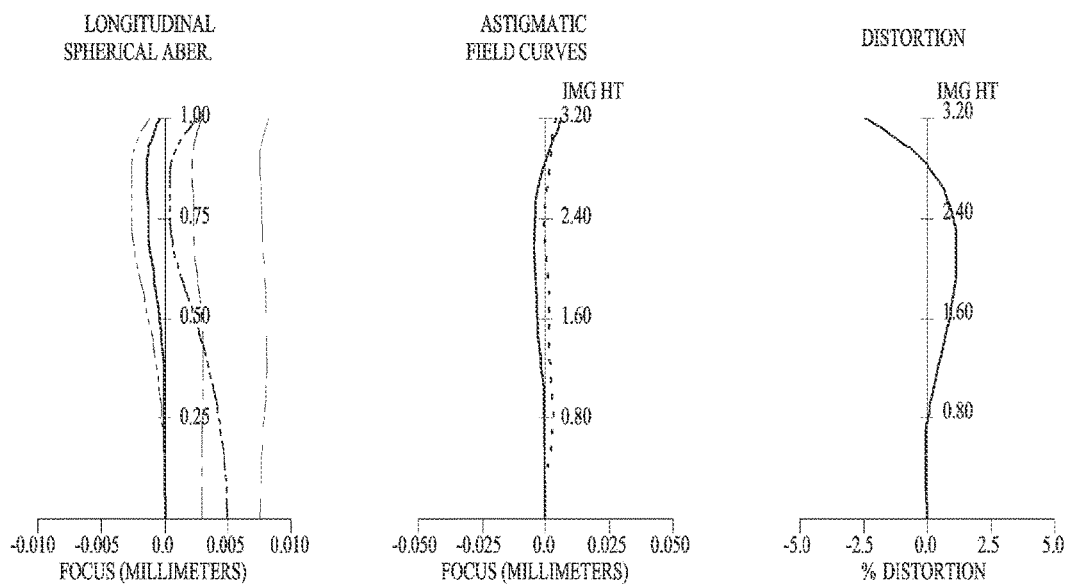

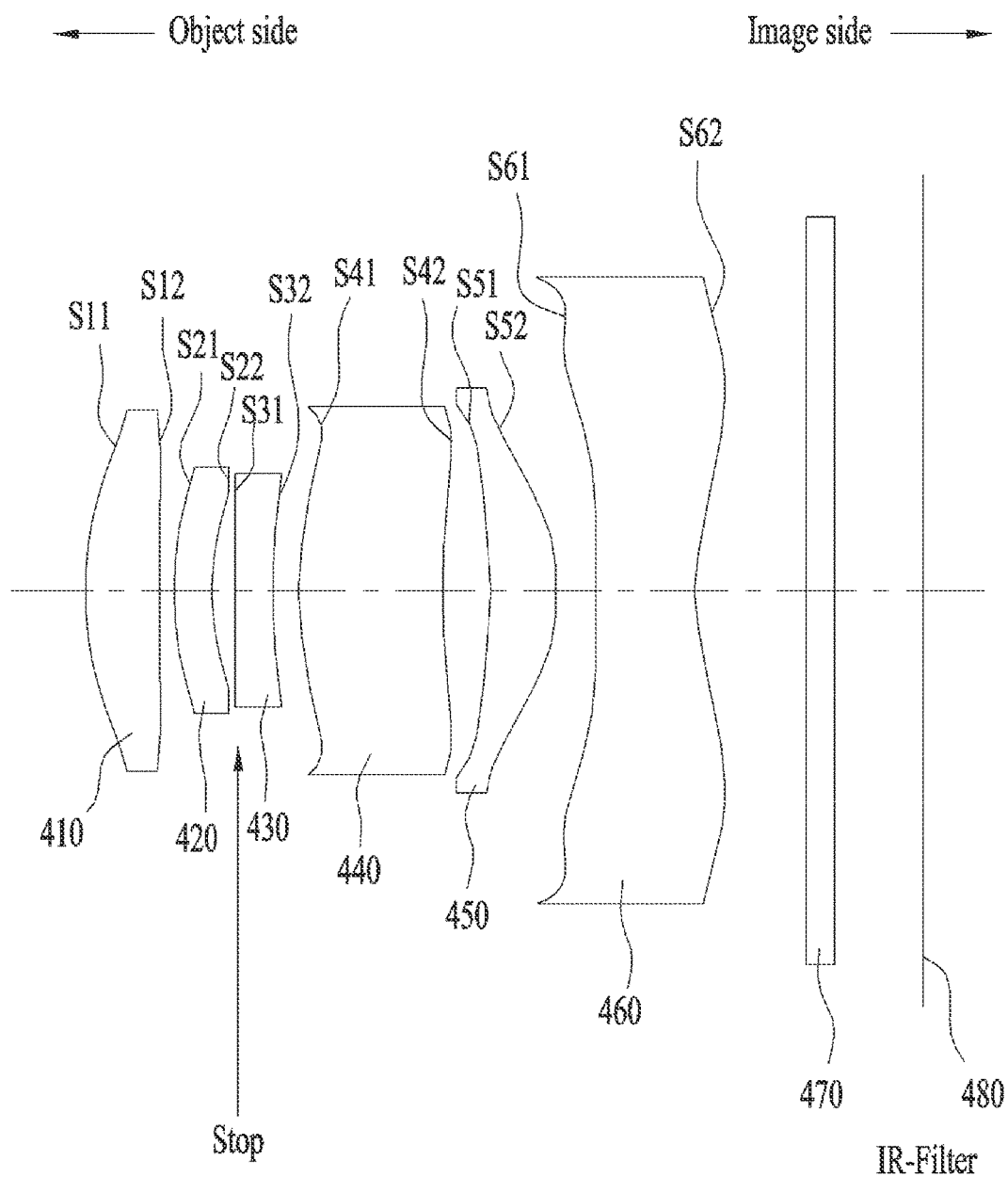

[Fig. 11]
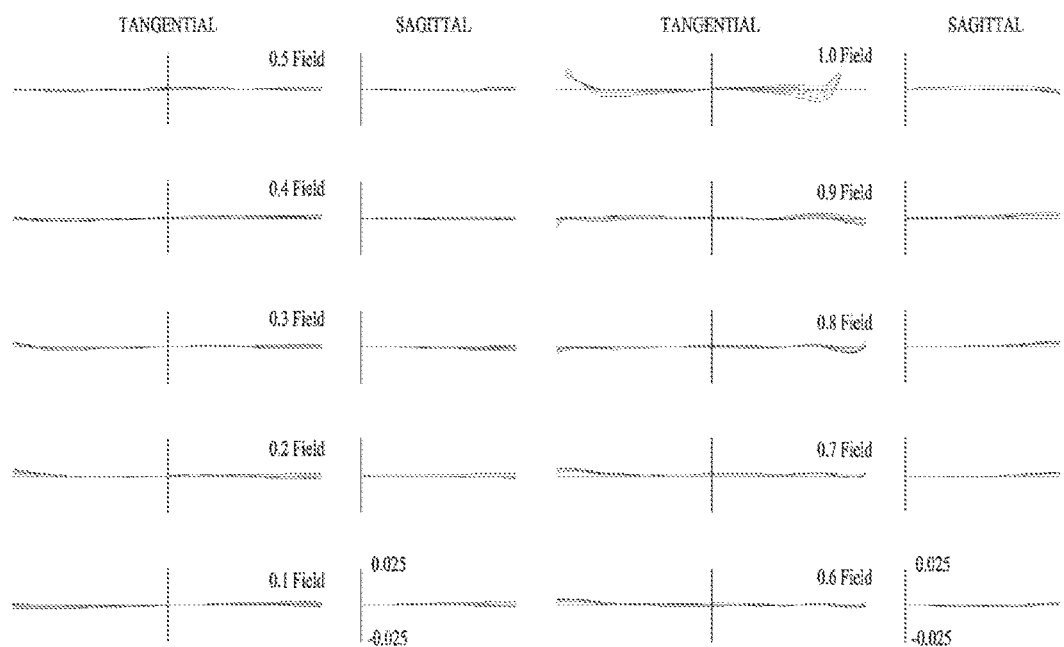
[Fig. 12]
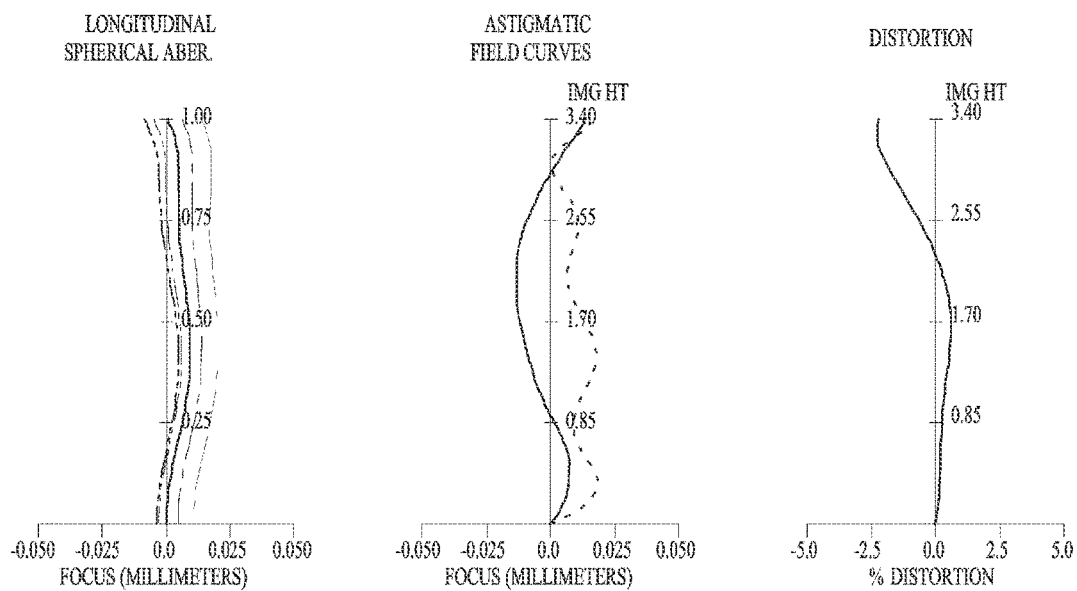

IMAGE PICKUP LENS AND CAMERA MODULE INCLUDING THE SAME

CROSS REFERENCE TO RELATED APPLICATION

This application claims the benefit under 35 U.S.C. § 119 of Korean Patent Application No. 10-2014-0083048, filed Jul. 3, 2014, which is hereby incorporated by reference in its entirety.

TECHNICAL FIELD

Embodiments relate to an image pickup lens and a camera module including the same.

BACKGROUND

Conventional film cameras have been replaced with, for example, camera modules for portable terminals, Digital Still Cameras (DSCs), camcorders, and PC cameras (image pickup devices attached to personal computers), which use small solid image pickup elements such as, for example, CCDs and CMOSs. These image pickup devices are becoming much thinner and smaller.

According to this trend, although light receiving elements, such as Charge Coupled Devices (CCDs), mounted in smaller image pickup devices, are being reduced in size, a part that occupies the greatest volume of the image pickup device is an image pickup lens part.

Accordingly, a constituent element that is becoming the greatest obstacle to realizing smaller and thinner image pickup devices is an image pickup lens, which forms an image of an object.

Here, it is required not only to simply implement a small image pickup lens, but also to achieve high performance of the image pickup lens in order to keep up with the higher performance of the light receiving element. However, a smaller image pickup lens is unavoidably closer to the light receiving element, which problematically causes light to be obliquely incident on the image forming surface of the image pickup device, thereby resulting in insufficient condensing of the image pickup lens and the potential of extreme variation in the brightness of an image from the center to the periphery of the image.

Increasing the number of lenses in consideration of the problems described above unavoidably increases the size of the image pickup device and is problematic in terms of the cost.

Therefore, there is a need to implement a high performance image pickup lens while considering manufacturing costs.

BRIEF SUMMARY

Accordingly, embodiments provide a high performance image pickup lens having low manufacturing costs.

In one embodiment, an image pickup lens includes a first lens to a sixth lens arranged in sequence from an object side to an image side, the first lens to the sixth lens each having refraction, wherein the first lens, the fourth lens, and the fifth lens each have positive refraction, wherein a first surface of the third lens facing the object side has a radius of curvature greater than a radius of curvature of a second surface of the third lens facing the image side, wherein a combined focal distance of the fourth lens and the fifth lens is greater than 1 and less than 3, wherein the fourth lens and the fifth lens each have an index of refraction of below 1.7, and wherein an image surface of the sixth lens has a point of inflection. The third lens and the sixth lens may have negative refraction.

The second lens may have negative refraction.

The Abbe number of the third lens may be greater than 20 and less than 30.

The Abbe number of the fourth lens, the fifth lens, and the sixth lens may be greater than 50 and less than 60.

The second lens, the fifth lens, and the sixth lens may have a meniscus shape.

A combined focal distance of the fourth lens and the fifth lens may be greater than 1 and less than 3.

The image pickup lens may further include a stop located between the second lens and the third lens.

The first lens may have two convex surfaces, or has a meniscus shape.

The image pickup lens may satisfy conditions of $0.5 < \Sigma T/f < 1.7$, $0.5 < f1/f < 1.5$, and $0.5 < f45/f < 3$. An index of refraction of the second lens may be greater than 1.6 and less than 1.7 and the image pickup lens may satisfy a condition of $1.5 < f/D < 2.6$.

An index of refraction of the fourth lens and the fifth lens may be below 1.7.

In another embodiment, an image pickup lens includes a first lens to a sixth lens arranged in sequence from an object side to an image side, the first lens to the sixth lens each having refraction, wherein the first lens, the fourth lens, and the fifth lens each have positive refraction, wherein a first surface of the third lens facing the object side has a radius of curvature greater than a radius of curvature of a second surface of the third lens facing the image side, and wherein an image surface of the sixth lens has a point of inflection and satisfies Condition Equation 1: $0.5 < \Sigma T/f < 1.7$ (where, $\Sigma T$ is a total thickness of an optical system, and f is a focal distance of the entire optical system).

In a further embodiment, a camera module includes the image pickup lens as described above, a filter configured to selectively transmit light, having passed through the image pickup lens, based on a wavelength, and a light receiving element configured to receive the light having passed through the filter.

The light receiving element may be an image sensor, and a horizontal and/or vertical length of a unit pixel of the image sensor may be 2 μm or less.

BRIEF DESCRIPTION OF THE DRAWINGS

Arrangements and embodiments may be described in detail with reference to the following drawings in which like reference numerals refer to like elements and wherein:

FIG. 1 is a view illustrating a first embodiment of an image pickup lens;

FIG. 2 is a graph measuring coma aberration of the first embodiment of the image pickup lens;

FIG. 3 is a graph illustrating various other aberrations according to the first embodiment of the image pickup lens;

FIG. 4 is a view illustrating a second embodiment of an image pickup lens;

FIG. 5 is a graph measuring coma aberration of the second embodiment of the image pickup lens;

FIG. 6 is a graph illustrating various other aberrations according to the second embodiment of the image pickup lens;

FIG. 7 is a view illustrating a third embodiment of an image pickup lens;

FIG. 8 is a graph measuring coma aberration of the third embodiment of the image pickup lens;

FIG. 9 is a graph illustrating various other aberrations according to the third embodiment of the image pickup lens;

FIG. 10 is a view illustrating a fourth embodiment of an image pickup lens;

FIG. 11 is a graph measuring coma aberration of the fourth embodiment of the image pickup lens; and FIG. 12 is a graph illustrating various other aberrations according to the fourth embodiment of the image pickup lens.

DESCRIPTION OF SPECIFIC EMBODIMENTS

Hereinafter, embodiments will be described with reference to the annexed drawings in order to concretely realize the objects as set forth above.

In the following description of the embodiments, "object surface" refers to the surface of a lens that faces the object side on the basis of the optical axis, and "image surface" refers to the surface of the lens that faces the image side on the basis of the optical axis.

In addition, in the embodiments, "+" power of the lens refers to a convergent lens, which converges parallel beams, and "−" power of the lens refers to a divergent lens, which diverges parallel beams.

FIG. 1 is a view illustrating the configuration of a first embodiment of an image pickup lens.

Referring to FIG. 1, the image pickup lens according to the first embodiment includes a first lens 110, a second lens 120, a third lens 130, a fourth lens 140, a fifth lens 150, and a sixth lens 160 in sequence from the object side to the image side. A stop may be included between the second lens 120 and the third lens 130. In addition, a filter 170 and a light receiving element 180 may be included in sequence at the back of the sixth lens 160 to constitute the image pickup lens within a camera module.

The filter 170 may be an optical member, for example, a flat plate shaped optical member such as, for example, a cover glass for the protection of an image pickup surface or an infrared ray filter. The light receiving element 180 may be an image sensor disposed on a printed circuit board (not illustrated).

When the light receiving element 180 is an image sensor, the horizontal and/or vertical length of a unit pixel of the image sensor may be 2 μm (micrometers) or less. The present embodiment and other embodiments to be described below may provide image pickup lenses that may be applied to camera modules having a high resolution of pixels and/or a large number of pixels, and these camera modules may include an image sensor or a light receiving element having a high resolution of pixels and/or a large number of pixels. In this case, the horizontal and/or vertical length of the unit pixel may be 2 μm or less.

In FIG. 1, "S11" is the object surface of the first lens 110, "S12" is the image surface of the first lens 110, "S21" is the object surface of the second lens 120, "S22" is the image surface of the second lens 120, "S31" is the object surface of the third lens 130, "S32" is the image surface of the third lens 130, "S41" is the object surface of the fourth lens 140, "S42" is the image surface of the fourth lens 140, "S51" is the object surface of the fifth lens 150, "S52" is the image surface of the fifth lens 150, "S61" is the object surface of the sixth lens 160, and "S62" is the image surface of the sixth lens 160.

"Sxy" as described above may be equally applied to the other embodiments of image pickup lenses, which will be described below.

The first lens 110 of the present embodiment has convex object and image surfaces, but, in other embodiments, may have a meniscus shape. The second lens 120, the fifth lens 150, and the sixth lens 160 may have a meniscus shape, and the image surface of the sixth lens 160 may have a concave shape and a point of inflection.

The object surfaces of the lenses have shapes as follows. The object surface of the first lens 110 may have a convex shape, the object surface of the second lens 120 may have a convex shape, the object surface of the third lens 130 may have a convex shape, the object surface of the fourth lens 140 may have a convex shape, the object surface of the fifth lens 150 may have a concave shape, and the object surface of the sixth lens 160 may have a convex shape.

The image surfaces of the lenses have shapes as follows. The image surface of the first lens 110 may have a convex shape, the image surface of the second lens 120 may have a concave shape, the image surface of the third lens 130 may have a concave shape, the image surface of the fourth lens 140 may have a concave shape, the image surface of the fifth lens 150 may have a convex shape, and the image surface of the sixth lens 160 may have a concave shape and a point of inflection.

To summarize the shapes of the object surfaces and the image surfaces of the lenses as described above, the first lens 110 has convex object and image surfaces, but may have a meniscus shape in other embodiments, the second lens 120 has a meniscus shape with a convex object surface and a concave image surface, the third lens 130 has a meniscus shape with a convex object surface and a concave image surface, the fourth lens 140 has a meniscus shape with a convex object surface and a concave image surface, the fifth lens 150 has a meniscus shape with a concave object surface and a convex image surface, and the sixth lens 160 has a meniscus shape with a convex object surface and a concave image surface.

Here, the shapes of the object surface and the image surface of each lens indicate shapes near the optical axis. When the object surface and the image surface of each lens have points of inflection respectively, the object surface and the image surface may have different shapes in regions distant from the optical axis.

In FIG. 1, the image surface S62 of the sixth lens 160 has a concave shape near the optical axis, but has a convex shape in an edge region across a point of inflection.

At least one of the object surface and the image surface of each lens as described above may have an aspherical shape. In particular, the object surface of the third lens 130 may be a flat surface, or may be close to a flat surface.

In addition, the first lens 110 may have a "+" power arrangement, the second lens 120 may have a "−" power arrangement, the third lens 130 may have a "−" power arrangement, the fourth lens 140 may have a "+" power arrangement, the fifth lens 150 may have a "+" power arrangement, and the sixth lens 160 may have a "−" power arrangement.

Here, "+" power arrangement means positive refraction and "−" power arrangement means negative refraction. The first lens 110, the fourth lens 140, and the fifth lens 150 each have positive refraction, the third lens 130 and the sixth lens 160 each have negative refraction, and the second lens 120 has negative refraction, without being limited thereto.

The power arrangements of the first lens 110 to the sixth lens 160 as described above may be the same as the embodiments to be described below, and enhanced optical performance, lower manufacturing costs, and smaller size of the image pickup lens may be anticipated.

In the present embodiment, the focal distance f of the entire optical system may be 5, the focal distance of the first lens 110 may be 6.13, the focal distance of the second lens 120 may be −12.16, the focal distance of the third lens 130 may be −7.88, the focal distance of the fifth lens 150 may be 2.21, and the focal distance of the sixth lens 160 may be −2.35.

In addition, the optical system may satisfy the following Equations 1 to 5. Here, ET may be the total thickness of the optical system, f45 may be the combined focal distance of the fourth lens 140 and the fifth lens 150, and FNO may be a numerical value indicating the brightness of the optical system. The FNO may be represented by the ratio of the focal distance f to the stop diameter D, i.e. f/D, and a greater quantity of light may be received as the FNO decreases.

$$0.5 < \Sigma T/f < 1.7 \qquad \text{<Equation 1>}$$

In Equation 1, the total thickness of the optical system may be reduced.

$$0.5 < f1/f < 1.5 \qquad \text{<Equation 2>}$$

Equation 2 is a condition range for the first lens 110 having relatively weak power to prevent performance deterioration caused mainly by manufacturing errors. When deviating from the above-described range of Equation 2, the power of the first lens 110 becomes stronger, which may increase respective aberrations caused by the first lens 110 and may also increase aberration correction burden on, for example, the second lens 120 and the third lens 130.

$$1 < f45/f < 3 \qquad \text{<Equation 3>}$$

When deviating from the above-described range of Equation 3, the power of the fourth lens 140 and the power of the fifth lens 150 become stronger, which may increase respective aberrations caused by the fourth lens 140 and the fifth lens 150 and may also increase aberration correction burden on the sixth lens 160.

$$1.6 < N2 < 1.7 \qquad \text{<Equation 4>}$$

$$1.5 < FNO < 2.6 \qquad \text{<Equation 5>}$$

In the present embodiment, f1/f may be 1.226, ΣT may be 7.5, and ΣT/f may be 1.5

In addition, the Abbe number of the first lens 110, the fourth lens 140, the fifth lens 150, and the sixth lens 160 may be greater than 50 and less than 60, and the Abbe number of the second lens 120 and the third lens 130 may be greater than 20 and less than 30. More specifically, the Abbe number of the first lens 110, the fourth lens 140, the fifth lens 150, and the sixth lens 160 may be 56 and the Abbe number of the second lens 120 and the third lens 130 may be 23.9. In addition, the Abbe number of the filter 170 may be 64.1.

The first embodiment of the image pickup lens as described above may have concrete features such as those set forth in the following Tables 1 and 2. Table 1 contains data of respective lens surfaces, Table 2 contains the Conic constant k and the aspherical coefficients A to D of the respective lens surfaces, "*" added in Table 1 and Table 2 represents an aspherical surface, and "S71" and "S72" are the image pickup surface and the image surface of the filter 170.

In addition, with relation to the column "Thickness or Distance", the numerical value written at the object surface of the lens is the thickness of the corresponding lens and the numerical value written at the image surface of the lens is the distance between the corresponding lens and the next lens. In the case of the stop, the numerical value written in the column "Thickness or Distance" means a distance to the third lens 130 next to the stop and the above description is the same as in other embodiments, which will be described below.

TABLE 1

| Sxy | Radius of Curvature (R) | Thickness or Distance (d) | Index of Refraction (N) | Abbe Number (vd) |
|---|---|---|---|---|
| S11* | 3.57 | 0.68 | 1.53 | 56 |
| S12* | −38.04 | 0.14 | | |
| S21* | 2.21 | 0.30 | 1.64 | 23.9 |
| S22* | 1.63 | 0.25 | | |
| Stop | Infinity | 0.05 | | |
| S31* | 10.79 | 0.74 | 1.64 | 23.9 |
| S32* | 3.35 | 0.10 | | |
| S41* | 3.02 | 1.49 | 1.53 | 56 |
| S42* | 8.09 | 0.51 | | |
| S51* | −199.46 | 0.81 | 1.53 | 56 |
| S52* | −1.17 | 0.13 | | |
| S61* | 5.15 | 0.59 | 1.53 | 56 |
| S62* | 0.96 | 0.90 | | |
| S71 | Infinity | 0.21 | 1.52 | 64.1 |
| S72 | Infinity | 0.55 | | |
| Light Receiving Element | Infinity | 0.00 | | |

TABLE 2

| xy | k | A | B | C | D |
|---|---|---|---|---|---|
| 11* | 6.15216.E−01 | −1.97586.E−03 | −2.38048.E−03 | −6.20315.E−04 | 4.16063.E−04 |
| 12* | 7.69161.E+01 | −1.08208.E−02 | 1.30364.E−02 | −9.97015.E−03 | 2.80212.E−03 |
| 21* | 6.55514.E+00 | −1.08803.E−02 | 8.55846.E−03 | −5.34661.E−03 | 1.25623.E−03 |
| 22* | −3.40237.E+00 | −8.17877.E−03 | 1.85546.E−03 | −1.44914.E−03 | −3.79609.E−04 |
| 31* | 9.95705.E+00 | −2.90174.E−02 | −3.07032.E−03 | −2.10348.E−03 | −7.11764.E−5 |
| 32* | −3.7644.E+01 | −9.90297.E−03 | −3.85749.E−03 | −1.59836.E−04 | −1.01768.E−04 |
| 41* | −2.73669.E+01 | −7.05479.E−03 | 1.57368.E−03 | 2.20065.E−04 | 2.10237.E−05 |
| 42* | −7.62050.E+01 | −1.40704.E−02 | −2.06519.E−03 | −5.02279.E−05 | 3.38372.E−05 |
| 51* | 3.43955.E+02 | −6.52418.E−03 | −1.15286.E−04 | −3.32558.E−04 | −2.10758.E−05 |
| 52* | −4.73571.E+00 | −2.55004.E−02 | 8.25539.E−03 | −1.25551.E−03 | 2.38167.E−04 |
| 61* | −1.13619.E+01 | −3.40502.E−02 | 5.25049.E−03 | −2.74769.E−04 | −4.47421.E−06 |
| 62* | −4.66033.E+00 | −2.08284.E−02 | 3.32087.E−03 | −4.02922.E−04 | 2.92466.E−05 |

The radius of curvature of the object surface S31 of the third lens 130 may be greater than the radius of curvature of the image surface S32 and, in particular, the object surface S31 may be a flat surface, or may be close to a flat surface. In the present embodiment, the radius of curvature of the object surface S31 of the third lens 130 is 10.79, which is greater than 3.35, which is the radius of curvature of the image surface S32.

In addition, in the present embodiment, all of the first lens 110 to the sixth lens 160 may be plastic lenses, and may have an index of refraction of below 1.7. In other embodiments, the first lens 110 or the second lens 120 may be formed of a material having a high index of refraction. When the first lens 110 or the second lens 120 is formed of another material, for example, when the first lens 110 or the second lens 120 is a glass mold lens, the index of refraction of the material may be 1.7 or more. Even at this time, in particular, the fourth lens 140 and the fifth lens 150 may be formed of a material having a low index of refraction such as, for example, plastic. This lens material selection may be advantageous for power distribution of the respective lenses.

In the case of the glass mold lens, it is necessary to set a high press temperature for lens formation due to a relatively high transition point, which easily causes deformation of a mold and increases manufacturing costs due to frequent mold replacement. In contrast, the plastic lens makes it easy to form an aspherical surface and is advantageous for the manufacture of small lenses.

In the present embodiment and other embodiments to be described below, the surfaces of the respective lenses may be subjected to coating to prevent reflection or to enhance surface hardness.

FIG. 2 is a graph measuring coma aberration of the first embodiment of the image pickup lens. The graph illustrates measured results of tangential aberration and sagittal aberration of respective wavelengths based on the field height of an image surface.

As will be appreciated from experimental results illustrated in the graph of FIG. 2, coma aberration correction may be improved closer to the X-axis in each of the positive axis and the negative axis. All measurement examples of FIG. 2 show good coma aberration correction because image values are close to the X-axis in almost all fields.

FIG. 3 is a graph illustrating various other aberrations according to the first embodiment of the image pickup lens. More specifically, FIG. 3 is a graph illustrating longitudinal spherical aberration, astigmatic field curves, and distortion in sequence from the left side.

In FIG. 3, the Y-axis represents the size of an image and the X-axis represents the focal distance (in units of mm) and distortion (expressed as a %). Aberration correction may be improved as the curves are closer to the Y-axis.

FIG. 4 is a view illustrating the configuration of a second embodiment of an image pickup lens.

Referring to FIG. 4, the image pickup lens according to the second embodiment includes a first lens 210, a second lens 220, a third lens 230, a fourth lens 240, a fifth lens 250, and a sixth lens 260 in sequence from the object side to the image side.

A stop may be included between the second lens 220 and the third lens 230. In addition, a filter 270 and a light receiving element 280 are included in sequence to constitute the image pickup lens within a camera module.

In FIG. 4, "S11" is the object surface of the first lens 210, "S12" is the image surface of the first lens 210, "S21" is the object surface of the second lens 220, "S22" is the image surface of the second lens 220, "S31" is the object surface of the third lens 230, "S32" is the image surface of the third lens 230, "S41" is the object surface of the fourth lens 240, "S42" is the image surface of the fourth lens 240, "S51" is the object surface of the fifth lens 250, "S52" is the image surface of the fifth lens 250, "S61" is the object surface of the sixth lens 260, and "S62" is the image surface of the sixth lens 260.

The filter 270 may be an optical member, for example, a flat plate shaped optical member such as, for example, a cover glass for the protection of an image pickup surface or an infrared ray filter. The light receiving element 280 may be an image sensor disposed on a printed circuit board (not illustrated).

In the present embodiment, the first lens 210 has convex object and image surfaces, but may have a meniscus shape in other embodiments. The second lens 220, the fifth lens 250, and the sixth lens 260 may have a meniscus shape, and the image surface of the sixth lens 260 may have a concave shape and a point of inflection.

The object surfaces of the lenses have shapes as follows. The object surface of the first lens 210 may have a convex shape, the object surface of the second lens 220 may have a convex shape, the object surface of the third lens 230 may have a convex shape, the object surface of the fourth lens 240 may have a convex shape, the object surface of the fifth lens 250 may have a concave shape, and the object surface of the sixth lens 260 may have a convex shape.

The image surfaces of the lenses have shapes as follows. The image surface of the first lens 110 may have a convex shape, the image surface of the second lens 220 may have a concave shape, the image surface of the third lens 230 may have a concave shape, the image surface of the fourth lens 240 may have a convex shape, the image surface of the fifth lens 250 may have a convex shape, and the image surface of the sixth lens 260 may have a concave shape.

To summarize the shapes of the object surfaces and the image surfaces of the lenses as described above, the first lens 210 has convex object and image surfaces, the second lens 220 has a meniscus shape with a convex object surface and a concave image surface, the third lens 230 has a meniscus shape with a convex object surface and a concave image surface, the fourth lens 240 has convex object and image surfaces, the fifth lens 250 has a meniscus shape with a concave object surface and a convex image surface, and the sixth lens 260 has a meniscus shape with a convex object surface and a concave image surface.

In FIG. 4, the image surface S62 of the sixth lens 260 has a concave shape near the optical axis, but has a convex shape in an edge region across a point of inflection.

At least one of the object surface and the image surface of each lens as described above may have an aspherical shape. In particular, the object surface of the third lens 230 may be a flat surface, or may be close to a flat surface.

In addition, the first lens 210 may have a "+" power arrangement, the second lens 220 may have a "−" power arrangement, the third lens 230 may have a "−" power arrangement, the fourth lens 240 may have a "+" power arrangement, the fifth lens 250 may have a "+" power arrangement, and the sixth lens 260 may have a "−" power arrangement.

In the present embodiment, the focal distance f of the entire optical system may be 4.38, the focal distance of the first lens 210 may be 4.01, the focal distance of the second lens 220 may be −9.60, the focal distance of the third lens 230 may be −4.96, the focal distance of the fifth lens 250 may be 2.41, and the focal distance of the sixth lens 260 may be −2.12.

In addition, the optical system may satisfy the following Equations 6 to 10. Here, ΣT may be the total thickness of the optical system, f45 may be the combined focal distance of the fourth lens 240 and the fifth lens 250, and FNO may be a numerical value indicating the brightness of the optical system. The FNO may be represented by the ratio of the focal distance f to the stop diameter D, i.e. f/D and a greater quantity of light may be received as the FNO decreases.

$0.5 < \Sigma T/f < 1.7$ <Equation 6>

$0.5 < f1/f < 1.5$ <Equation 7>

$1 < f45f < 3$ <Equation 8>

$1.6 < N2 < 1.7$ <Equation 9>

$1.5 < FNO < 3.0$ <Equation 10>

In the present embodiment, f1/f may be 0.91, ΣT may be 6.3, and ΣT/f may be 1.43.

In addition, the Abbe number of the fourth lens 240, the fifth lens 250, and the sixth lens 260 may be greater than 50 and less than 60, and the Abbe number of the second lens 220 and the third lens 230 may be greater than 20 and less than 30. More specifically, the Abbe number of the fourth lens 240, the fifth lens 250, and the sixth lens 260 may be 56 and the Abbe number of the second lens 120 and the third lens 130 may be 23.9.

In addition, the Abbe number of the first lens 210 may be 40.9, and the Abbe number of the filter 270 may be 64.1.

The second embodiment of the image pickup lens as described above may have concrete features such as those set forth in the following Tables 3 and 4. Table 3 contains data of respective lens surfaces, Table 4 contains the Conic constant k and the aspherical coefficients A to D of the respective lens surfaces, "*" added in Table 3 and Table 4 represents an aspherical surface, and "S71" and "S72" are an image pickup surface and an image surface of the filter 270.

TABLE 3

| Sxy | Radius of Curvature (R) | Thickness or Distance (d) | Index of Refraction (N) | Abbe Number (vd) |
|---|---|---|---|---|
| S11* | 3.38 | 0.54 | 1.80 | 40.9 |
| S12* | −75.56 | 0.10 | | |
| S21* | 2.40 | 0.18 | 1.64 | 23.9 |
| S22* | 1.67 | 0.16 | | |
| Stop | Infinity | 0.05 | | |
| S31* | 33.65 | 0.40 | 1.64 | 23.9 |
| S32* | 2.74 | 0.12 | | |
| S41* | 3.34 | 1.27 | 1.53 | 56 |
| S42* | −7.97 | 0.92 | | |
| S51* | −6.28 | 0.65 | 1.53 | 56 |
| S52* | −1.10 | 0.12 | | |
| S61* | 4.97 | 0.57 | 1.53 | 56 |
| S62* | 0.88 | 0.69 | | |

TABLE 3-continued

| Sxy | Radius of Curvature (R) | Thickness or Distance (d) | Index of Refraction (N) | Abbe Number (vd) |
|---|---|---|---|---|
| S71 | Infinity | 0.21 | 1.52 | 64.1 |
| S72 | Infinity | 0.32 | | |
| Light Receiving Element | Infinity | 0.00 | | |

TABLE 4

| xy | k | A | B | C | D |
|---|---|---|---|---|---|
| 11* | 1.4136.E−01 | −2.7589.E−03 | −2.2179.E−03 | −6.8695.E−04 | 3.1407.E−04 |
| 12* | 8.8715.E+02 | −9.9341.E−03 | 1.3355.E−02 | −9.7054.E−03 | 2.9062.E−03 |
| 21* | −7.6518.E+00 | −1.6716.E−02 | 7.2713.E−03 | 7.3812.E−03 | 1.6605.E−02 |
| 22* | −2.9885.E+00 | −3.6593.E−03 | 2.4534.E−03 | 3.0762.E−03 | −6.2040.E−02 |
| 31* | 1.8795.E+02 | −3.0881.E−02 | 2.5351.E−02 | −1.5447.E−02 | −2.2310.E−03 |
| 32* | −2.1747.E+01 | 4.3868.E−03 | 2.8488.E−03 | −3.3423.E−04 | −6.0541.E−03 |
| 41* | −2.7695.E+01 | −5.6570.E−03 | 5.0633.E−03 | −4.4197.E−04 | −1.4747.E−03 |
| 42* | −2.3897.E+01 | −1.5521.E−02 | −6.6497.E−04 | 2.6712.E−04 | 1.9218.E−05 |
| 51* | −1.1926.E+02 | −8.2230.E−03 | 1.0045.E−03 | −2.4329.E−04 | −3.7353.E−05 |
| 52* | −5.2795.E+00 | −2.3342.E−02 | 7.8838.E−03 | −1.3670.E−03 | 2.3124.E−04 |
| 61* | −2.6717.E+01 | −3.5926.E−02 | 5.7792.E−03 | −2.4523.E−04 | 1.2397.E−06 |
| 62* | −5.0895.E+00 | −2.0707.E−02 | 3.5268.E−03 | −4.5467.E−04 | 2.7407.E−05 |

The radius of curvature of the object surface S31 of the third lens 230 may be greater than the radius of curvature of the image surface S32.

In addition, in the present embodiment, the first lens 210 may be a glass mold lens having a high index of refraction, and all of the second lens 220 to the sixth lens 260 may be plastic lenses and have an index of refraction of below 1.7.

FIG. 5 is a graph measuring coma aberration of the second embodiment of the image pickup lens. The graph illustrates measured results of tangential aberration and sagittal aberration of respective wavelengths based on the field height of an image surface.

As will be appreciated from experimental results illustrated in the graph of FIG. 5, coma aberration correction may be improved closer to the X-axis in each of the positive axis and the negative axis. All measurement examples of FIG. 5 show good coma aberration correction because image values are close to the X-axis in almost all fields.

FIG. 6 is a graph illustrating various other aberrations according to the second embodiment of the image pickup lens. More specifically, FIG. 6 is a graph illustrating longitudinal spherical aberration, astigmatic field curves, and distortion in sequence from the left side.

In FIG. 6, the Y-axis represents the size of an image and the X-axis represents the focal distance (in units of mm) and distortion (expressed as a %). Aberration correction may be improved as the curves are closer to the Y-axis.

FIG. 7 is a view illustrating the configuration of a third embodiment of an image pickup lens.

Referring to FIG. 7, the image pickup lens according to the third embodiment includes a first lens 310, a second lens 320, a third lens 330, a fourth lens 340, a fifth lens 350, and a sixth lens 360 in sequence from the object side to the image side.

A stop may be included between the second lens 320 and the third lens 330. In addition, a filter 370 and a light receiving element 380 are included in sequence to constitute the image pickup lens within a camera module.

In FIG. 7, "S11" is the object surface of the first lens 310, "S12" is the image surface of the first lens 310, "S21" is the object surface of the second lens 320, "S22" is the image surface of the second lens 320, "S31" is the object surface of the third lens 330, "S32" is the image surface of the third lens 330, "S41" is the object surface of the fourth lens 340, "S42" is the image surface of the fourth lens 340, "S51" is the object surface of the fifth lens 350, "S52" is the image surface of the fifth lens 350, "S61" is the object surface of the sixth lens 360, and "S62" is the image surface of the sixth lens 360.

The filter 370 may be an optical member, for example, a flat plate shaped optical member such as, for example, a cover glass for the protection of an image pickup surface or an infrared ray filter. The light receiving element 380 may be an image sensor disposed on a printed circuit board (not illustrated).

In the present embodiment, the first lens 310 has convex object and image surfaces, but may have a meniscus shape in other embodiments. The second lens 320, the fifth lens 350, and the sixth lens 360 may have a meniscus shape, and the image surface of the sixth lens 360 may have a concave shape and a point of inflection.

The object surfaces of the lenses have shapes as follows. The object surface of the first lens 310 may have a convex shape, the object surface of the second lens 320 may have a convex shape, the object surface of the third lens 330 may have a concave shape, the object surface of the fourth lens 340 may have a convex shape, the object surface of the fifth lens 350 may have a concave shape, and the object surface of the sixth lens 360 may have a convex shape.

The image surfaces of the lenses have shapes as follows. The image surface of the first lens 310 may have a convex shape, the image surface of the second lens 320 may have a concave shape, the image surface of the third lens 330 may have a concave shape, the image surface of the fourth lens 340 may have a convex shape, the image surface of the fifth lens 350 may have a convex shape, and the image surface of the sixth lens 360 may have a concave shape.

To summarize the shapes of the object surfaces and the image surfaces of the lenses as described above, the first lens 310 has convex object and image surfaces, the second lens 320 has a meniscus shape with a convex object surface and a concave image surface, the third lens 330 has concave object and image surfaces, the fourth lens 340 has convex object and image surfaces, the fifth lens 350 has a meniscus shape with a concave object surface and a convex image surface, and the sixth lens 360 has a meniscus shape with a convex object surface and a concave image surface.

In FIG. 7, the image surface S62 of the sixth lens 360 has a concave shape near the optical axis, but has a convex shape in an edge region across a point of inflection.

At least one of the object surface and the image surface of each lens as described above may have an aspherical shape.

In addition, the first lens 310 may have a "+" power arrangement, the second lens 320 may have a "−" power arrangement, the third lens 330 may have a "−" power arrangement, the fourth lens 340 may have a "+" power arrangement, the fifth lens 350 may have a "+" power arrangement, and the sixth lens 360 may have a "−" power arrangement.

In the present embodiment, the focal distance f of the entire optical system may be 4.91, the focal distance of the first lens 310 may be 5.29, the focal distance of the second lens 320 may be −18.22, the focal distance of the third lens 330 may be −4.09, the focal distance of the fourth lens 340 may be 3.52, the focal distance of the fifth lens 350 may be 2.49, and the focal distance of the sixth lens 360 may be −1.88.

In addition, the optical system may satisfy the following Equations 11 to 15. Here, ET may be the total thickness of the optical system, f45 may be the combined focal distance of the fourth lens 340 and the fifth lens 350, and FNO may be a numerical value indicating the brightness of the optical system. The FNO may be represented by the ratio of the focal distance f to the stop diameter D.

$$0.5 < \Sigma T/f < 1.7 \qquad \text{<Equation 11>}$$

$$0.5 < f1/f < 1.5 \qquad \text{<Equation 12>}$$

$$1 < f45/f < 3 \qquad \text{<Equation 13>}$$

$$1.6 < N2 < 1.85 \qquad \text{<Equation 14>}$$

$$1.5 < FNO < 3.0 \qquad \text{<Equation 15>}$$

In the present embodiment, f1/f may be 1.07, ΣT may be 6.69, and ΣT/f may be 1.36.

In addition, the Abbe number of the fourth lens 340, the fifth lens 350, and the sixth lens 360 may be greater than 50 and less than 60, and the Abbe number of the second lens 320 and the third lens 330 may be greater than 20 and less than 30. More specifically, the Abbe number of the fourth lens 340, the fifth lens 350, and the sixth lens 360 may be 56, the Abbe number of the first lens 310 and the second lens 320 may be 40.9, and the Abbe number of the third lens 330 may be 23.9. In addition, the Abbe number of the filter 370 may be 64.1.

The third embodiment of the image pickup lens as described above may have concrete features such as those set forth in the following Tables 5 and 6. Table 5 contains data of respective lens surfaces, Table 6 contains the Conic constant k and the aspherical coefficients A to D of the respective lens surfaces, "*" added in Table 5 and Table 6 represents an aspherical surface, and "S71" and "S72" are the image pickup surface and the image surface of the filter 370.

TABLE 5

| Sxy | Radius of Curvature (R) | Thickness or Distance (d) | Index of Refraction (N) | Abbe Number (vd) |
|---|---|---|---|---|
| S11* | 4.57 | 0.37 | 1.80 | 40.9 |
| S12* | −66.20 | 0.10 | | |
| S21* | 3.25 | 0.30 | 1.80 | 40.9 |
| S22* | 2.55 | 0.10 | | |
| Stop | Infinity | 0.05 | | |
| S31* | −95.18 | 0.35 | 1.64 | 23.9 |
| S32* | 2.70 | 0.14 | | |
| S41* | 4.21 | 0.82 | 1.53 | 56 |
| S42* | −3.15 | 2.04 | | |
| S51* | −10.22 | 0.68 | 1.53 | 56 |
| S52* | −1.20 | 0.10 | | |
| S61* | 1441.22 | 0.46 | 1.53 | 56 |
| S62* | 1.00 | 0.69 | | |
| S71 | Infinity | 0.21 | 1.52 | |
| S72 | Infinity | 0.22 | | |
| Light Receiving Element | Infinity | 0.00 | | |

TABLE 6

| xy | k | A | B | C | D |
|---|---|---|---|---|---|
| 11* | 6.4287.E−01 | −1.0967.E−03 | −1.9491.E−03 | −7.4769.E−04 | 7.1958.E−05 |
| 12* | −3.7467.E+03 | −1.0014.E−02 | 1.2623.E−02 | −9.8162.E−03 | 2.9267.E−03 |
| 21* | −7.0236.E+00 | −1.4209.E−02 | 7.8032.E−03 | 2.7407.E−04 | 6.0307.E−03 |
| 22* | −2.7580.E+00 | −5.8759.E−03 | −1.3064.E−02 | 3.2181.E−02 | −2.7999.E−02 |
| 31* | 1.3616.E+04 | −3.8716.E−02 | 3.0904.E−02 | −2.5076.E−02 | −2.9932.E−02 |
| 32* | −1.6780.E+01 | 1.0383.E−02 | −2.4186.E−03 | −8.2860.E−03 | −5.9612.E−03 |
| 41* | −2.9633.E+01 | 3.9112.E−03 | 1.0349.E−02 | −1.4501.E−03 | 2.0399.E−03 |
| 42* | −3.2114.E+00 | −1.9641.E−02 | 3.1857.E−03 | 6.9864.E−04 | 7.0780.E−04 |
| 51* | −4.2494.E+01 | −8.7330.E−03 | 1.6076.E−03 | −1.4615.E−04 | −2.6497.E−05 |
| 52* | −6.3184.E+00 | −1.7576.E−02 | 7.3715.E−03 | −1.4383.E−03 | 2.3047.E−04 |
| 61* | −1.2165.E+08 | −3.4990.E−02 | 5.9450.E−03 | −2.7576.E−04 | −3.0460.E−06 |
| 62* | −5.9032.E+00 | −1.8137.E−02 | 3.3490.E−03 | −4.2668.E−04 | 3.1550.E−05 |

The radius of curvature of the object surface S31 of the third lens 330 may be greater than the radius of curvature of the image surface S32. In particular, the object surface S31 may be a flat surface, or may be close to a flat surface. Here, the magnitude of the radius of curvature is the magnitude of an absolute value of the radius of curvature regardless of whether the object surface S31 is concave or convex, i.e. whether the radius of curvature has a negative value or a positive value. This is the same as the other embodiments.

In addition, in the present embodiment, all of the third lens 330 to the sixth lens 360 may be plastic lenses and have an index of refraction of below 1.7. In addition, the first lens 310 and the second lens 320 may be formed of a material having a high index of refraction. For example, the first lens 310 and the second lens 320 may be glass mold lenses.

FIG. 8 is a graph measuring coma aberration of the third embodiment of the image pickup lens. The graph illustrates measured results of tangential aberration and sagittal aberration of respective wavelengths based on the field height of an image surface.

As will be appreciated from experimental results illustrated in the graph of FIG. 8, coma aberration correction may be improved closer to the X-axis in each of the positive axis and the negative axis. All measurement examples of FIG. 8 show good coma aberration correction because image values are close to the X-axis in almost all fields.

FIG. 9 is a graph illustrating various other aberrations according to the third embodiment of the image pickup lens. More specifically, FIG. 9 is a graph illustrating longitudinal spherical aberration, astigmatic field curves, and distortion in sequence from the left side.

In FIG. 9, the Y-axis represents the size of an image and the X-axis represents the focal distance (in units of mm) and distortion (expressed as a %). Aberration correction may be improved as the curves are closer to the Y-axis.

FIG. 10 is a view illustrating the configuration of a fourth embodiment of an image pickup lens.

Referring to FIG. 10, the image pickup lens according to the fourth embodiment includes a first lens 410, a second lens 420, a third lens 430, a fourth lens 440, a fifth lens 450, and a sixth lens 460 in sequence from the object side to the image side.

A stop may be included between the second lens 420 and the third lens 430. In addition, a filter 470 and a light receiving element 480 are included in sequence to constitute the image pickup lens within a camera module.

In FIG. 10, "S11" is the object surface of the first lens 410, "S12" is the image surface of the first lens 410, "S21" is the object surface of the second lens 420, "S22" is the image surface of the second lens 420, "S31" is the object surface of the third lens 430, "S32" is the image surface of the third lens 430, "S41" is the object surface of the fourth lens 440, "S42" is the image surface of the fourth lens 440, "S51" is the object surface of the fifth lens 450, "S52" is the image surface of the fifth lens 450, "S61" is the object surface of the sixth lens 460, and "S62" is the image surface of the sixth lens 460.

The filter 470 may be an optical member, for example, a flat plate shaped optical member such as, for example, a cover glass for the protection of an image pickup surface or an infrared ray filter. The light receiving element 380 may be an image sensor disposed on a printed circuit board (not illustrated).

In the present embodiment, the first lens 410 has a meniscus shape with a convex object surface and a concave image surface, but may have convex object and image surfaces in other embodiments. The second lens 420, the fifth lens 450, and the sixth lens 460 may have a meniscus shape, and the image surface of the sixth lens 460 may have a concave shape and a point of inflection.

The object surfaces of the lenses have shapes as follows. The object surface of the first lens 410 may have a convex shape, the object surface of the second lens 420 may have a convex shape, the object surface of the third lens 430 may have a flat surface, the object surface of the fourth lens 440 may have a convex shape, the object surface of the fifth lens 450 may have a concave shape, and the object surface of the sixth lens 460 may have a convex shape.

The image surfaces of the lenses have shapes as follows. The image surface of the first lens 410 may have a concave shape, the image surface of the second lens 420 may have a concave shape, the image surface of the third lens 430 may have a concave shape, the image surface of the fourth lens 440 may have a concave shape, the image surface of the fifth lens 450 may have a convex shape, and the image surface of the sixth lens 460 may have a concave shape.

To summarize the shapes of the object surfaces and the image surfaces of the lenses as described above, the first lens 410 has a meniscus shape with a convex object surface and a concave image surface, the second lens 420 has a meniscus shape with a convex object surface and a concave image surface, the third lens 430 has a flat object surface and a concave image surface, the fourth lens 440 has a meniscus shape with a convex object surface and a concave image surface, the fifth lens 450 has a meniscus shape with a concave object surface and a convex image surface, and the sixth lens 460 has a meniscus shape with a convex object surface and a concave image surface.

In FIG. 10, the image surface S62 of the sixth lens 460 has a concave shape near the optical axis, but has a convex shape in an edge region across a point of inflection.

At least one of the object surface and the image surface of each lens as described above may have an aspherical shape. In particular, the object surface of the third lens 430 may be a flat surface, or may be close to a flat surface.

In addition, the first lens 410 may have a "+" power arrangement, the second lens 420 may have a "−" power arrangement, the third lens 430 may have a "−" power arrangement, the fourth lens 440 may have a "+" power arrangement, the fifth lens 450 may have a "+" power arrangement, and the sixth lens 460 may have a "−" power arrangement.

In the present embodiment, the focal distance f of the entire optical system may be 5.23, the focal distance of the first lens 410 may be 5.74, the focal distance of the second lens 420 may be −16.82, the focal distance of the third lens 430 may be −7.41, the focal distance of the fourth lens 440 may be 7.73, the focal distance of the fifth lens 450 may be 3.43, and the focal distance of the sixth lens 460 may be −3.59.

In addition, the optical system may satisfy the following Equations 16 to 20. Here, $\Sigma T$ may be the total thickness of the optical system, f45 may be the combined focal distance of the fourth lens 440 and the fifth lens 450, and FNO may be a numerical value indicating the brightness of the optical system. The FNO may be represented by the ratio of the focal distance f to the stop diameter D.

$0.5 < \Sigma T/f < 1.7$            <Equation 16>

$0.5 < f1/f < 1.5$            <Equation 17>

$1 < f45/f < 3$            <Equation 18>

$1.6 < N2 < 1.85$            <Equation 19>

$1.5 < FNO < 3.0$            <Equation 20>

In the present embodiment, f1/f may be 1.09, $\Sigma T$ may be 6.69, and $\Sigma T/f$ may be 1.27.

In addition, the Abbe number of the first lens 410, the fourth lens 440, the fifth lens 450, and the sixth lens 460 may be greater than 50 and less than 60, and the Abbe number of the second lens 420 and the third lens 430 may be greater than 20 and less than 30. More specifically, the Abbe number of the first lens 410, the fourth lens 440, the fifth lens 450, and the sixth lens 460 may be 56, and the Abbe number of the second lens 420 and the third lens 430 may be 23.9. In addition, the Abbe number of the filter 470 may be 64.1.

The fourth embodiment of the image pickup lens as described above may have concrete features such as set forth in the following Tables 7 and 8. Table 7 contains data of respective lens surfaces, Table 8 contains the Conic constant k and the aspherical coefficients A to D of the respective lens surfaces, "*" added in Table 7 and Table 8 represents an aspherical surface, and "S71" and "S72" are the image pickup surface and the image surface of the filter 470.

TABLE 7

| Sxy | Radius of Curvature (R) | Thickness or Distance (d) | Index of Refraction (N) | Abbe Number (vd) |
|---|---|---|---|---|
| S11* | 2.94 | 0.61 | 1.53 | 56 |
| S12* | 76.17 | 0.1 | | |
| S21* | 2.24 | 0.3 | 1.64 | 23.9 |
| S22* | 1.76 | 0.15 | | |
| Stop | Infinity | 0.05 | | |
| S31 | Infinity | 0.30 | 1.64 | 23.9 |
| S32* | 4.755 | 0.20 | | |
| S41* | 2.65 | 1.14 | 1.53 | 56 |
| S42* | 6.33 | 0.48 | | |
| S51* | −4.45 | 0.53 | 1.53 | 56 |
| S52* | −1.35 | 0.31 | | |
| S61* | 51.29 | 0.80 | 1.53 | 56 |
| S62* | 1.83 | 0.90 | | |
| S71 | Infinity | 0.21 | 1.52 | |
| S72 | Infinity | 0.70 | | |
| Light Receiving Element | Infinity | 0.00 | | |

TABLE 8

| xy | k | A | B | C | D |
|---|---|---|---|---|---|
| 11* | 7.4291.E−01 | 1.5188.E−03 | −3.4421.E−03 | 6.5277.E−05 | 4.8206.E−04 |
| 12* | 2.4616.E+03 | −7.0959.E−03 | 1.3322.E−02 | −1.1760.E−02 | 1.4584.E−03 |
| 21* | −5.4876.E+00 | −1.8984.E−02 | −4.7042.E−03 | 3.2699.E−03 | 1.2230.E−02 |
| 22* | −3.3233.E+00 | −1.6343.E−02 | −3.1610.E−02 | 1.9963.E−02 | 4.5019.E−02 |
| 32* | −5.5986.E+01 | 2.3913.E−03 | 2.1378.E−02 | 9.8969.E−04 | −2.8413.E−02 |
| 41* | −1.4637.E+01 | 6.0172.E−03 | −3.3768.E−03 | −1.9766.E−03 | 7.5992.E−03 |
| 42* | 5.2820.E+00 | −1.0282.E−02 | −8.2682.E−03 | −1.2667.E−03 | 5.4411.E−05 |
| 51* | −2.3407.E+01 | 2.8961.E−04 | 1.9501.E−03 | −2.3499.E−03 | −1.0470.E−03 |
| 52* | −2.9704.E+00 | −2.2600.E−02 | 1.0727.E−02 | −2.0199.E−04 | 6.6251.E−04 |
| 61* | −7.1229.E+04 | −4.5339.E−02 | 5.1512.E−03 | 1.2040.E−04 | 1.1043.E−04 |
| 62* | −9.2634.E+00 | −2.9655.E−02 | 3.4865.E−03 | −4.2571.E−04 | 6.3685.E−05 |

In the above-described embodiments, although all of the object surfaces and the image surfaces of the first lens to the sixth lens are aspherical surfaces, the object surface S31 of the third lens 430 in the present embodiment may be a spherical surface. As at least one surface of each of the lenses is the aspherical surface, the lenses may be good for correction of various aberrations, for example, spherical surface aberration, coma aberration, and distortion.

The radius of curvature of the object surface S31 of the third lens 430 may be greater than the radius of curvature of the image surface S32. In particular, the object surface S31 may be a flat surface, or may be close to a flat surface.

In the first to the fourth embodiments of the pickup lens modules, the radius of curvature of the object surface S31 of the third lens may be 4.5 or more.

In addition, in the present embodiment, all of the first lens 410 to the sixth lens 460 may be plastic lenses and have an index of refraction of below 1.7.

FIG. 11 is a graph measuring coma aberration of the fourth embodiment of the image pickup lens. The graph illustrates measured results of tangential aberration and sagittal aberration of respective wavelengths based on the field height of an image surface.

As will be appreciated from experimental results illustrated in the graph of FIG. 11, coma aberration correction may be improved closer to the X-axis in each of the positive axis and the negative axis. All measurement examples of FIG. 11 show good coma aberration correction because image values are close to the X-axis in almost all fields.

FIG. 12 is a graph illustrating various other aberrations according to the fourth embodiment of the image pickup lens. More specifically, FIG. 12 is a graph illustrating longitudinal spherical aberration, astigmatic field curves, and distortion in sequence from the left side.

In FIG. 12, the Y-axis represents the size of an image and the X-axis represents the focal distance (in units of mm) and distortion (expressed as a %). Aberration correction may be improved as the curves are closer to the Y-axis.

A camera module including the image pickup lens as described above may be mounted in various digital devices such as, for example, a digital camera, a smartphone, a laptop computer, and a tablet PC.

As is apparent from the above description, an image pickup lens according to the embodiments may have a smaller size and higher performance.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image pickup lens comprising:
a first lens to a sixth lens arranged in sequence from an object side to an image side, the first lens to the sixth lens each having refraction, and the second lens, the third lens and the sixth lens each having negative refraction;
wherein the first lens, the fourth lens, and the fifth lens each has positive refraction,
wherein an object side surface of the third lens facing the object side has a radius of curvature greater than a radius of curvature of an image side surface of the third lens facing the image side,
wherein an object side surface of the first lens has a convex shape, an image side surface of the first lens has a convex shape, an object side surface of the second lens has a convex shape, an image side surface of the second lens has a concave shape, the object side surface of the third lens has a concave shape in a paraxial region of the third lens, the image side surface of the third lens has a concave shape in the paraxial region of the third lens, an object side surface of the fourth lens has a convex shape in a paraxial region of the fourth lens, an image side surface of the fourth lens has a convex shape in the paraxial region of the fourth lens, an object side surface of the fifth lens has a concave shape, an image side surface of the fifth lens has a convex shape, an object side surface of the sixth lens has a convex shape in a paraxial region of the sixth lens, and an image side surface of the sixth lens has a concave shape in the paraxial region of the sixth lens,
wherein the fourth lens and the fifth lens each has an index of refraction smaller than 1.7,
wherein a second surface of the sixth lens has a point of inflection; and
wherein the image pickup lens is configured to satisfy Condition Equation 3 such that respective aberrations of the fourth lens and the fifth lens are inhibited from being increased:

$$1 < f45/f < 3, \qquad \text{<Condition Equation 3>}$$

wherein f45 is a combined focal distance of the fourth lens and the fifth lens, and f is a focal distance of the entire image pickup lens.

2. The image pickup lens according to claim 1, wherein an Abbe number of the third lens is greater than 20 and less than 30.

3. The image pickup lens according to claim 1, wherein an Abbe number of each of the fourth lens, the fifth lens, and the sixth lens is greater than 50 and less than 60.

4. The image pickup lens according to claim 1, wherein a combined focal distance of the fourth lens and the fifth lens is greater than 1 and less than 3.

5. The image pickup lens according to claim 1, further comprising a stop located between the second lens and the third lens.

6. The image pickup lens according to claim 1, wherein the image pickup lens satisfies Condition Equation 1:

$$0.5 < \Sigma T/f < 1.7, \qquad \text{<Condition Equation 1>}$$

wherein $\Sigma T$ is a total thickness of an optical system, and f is a focal distance of the entire optical system.

7. The image pickup lens according to claim 1, wherein the image pickup lens satisfies Condition Equation 2:

$$0.5 < f1/f < 1.5, \qquad \text{<Condition Equation 2>}$$

wherein f1 is a focal distance of the first lens, and f is a focal distance of an entire optical system.

8. The image pickup lens according to claim 1, wherein an index of refraction of the second lens is greater than 1.6 and less than 1.7.

9. The image pickup lens according to claim 1, wherein the image pickup lens satisfies Condition Equation 4:

$$1.5 < f/D < 2.6, \qquad \text{<Condition Equation 4>}$$

wherein f is a focal distance of an entire optical system, and D is a diameter of a stop.

10. The image pickup lens according to claim 1, wherein an index of refraction of each of the fourth lens and the fifth lens is less than 1.7.

11. An image pickup lens comprising:
a first lens to a sixth lens arranged in sequence from an object side to an image side, the first lens to the sixth lens each having refraction,
wherein the first lens, the fourth lens, and the fifth lens each has positive refraction, and the second lens, the third lens, and the sixth lens each has negative refraction;
wherein an object side surface of the third lens facing the object side has a radius of curvature greater than a radius of curvature of an image side surface of the third lens facing the image side,
wherein an object side surface of the first lens has a convex shape, an image side surface of the first lens has a convex shape, an object side surface of the second lens has a convex shape, an image side surface of the second lens has a concave shape, the object side surface of the third lens has a concave shape in a paraxial region of the third lens, the image side surface of the third lens has a concave shape in the paraxial region of the third lens, an object side surface of the fourth lens has a convex shape in a paraxial region of the fourth lens, an image side surface of the fourth lens has a convex shape in the paraxial region of the fourth lens, an object side surface of the fifth lens has a concave shape, an image side surface of the fifth lens has a convex shape, an object side surface of the sixth lens has a convex shape in a paraxial region of the sixth lens, and an image side surface of the sixth lens has a concave shape in the paraxial region of the sixth lens, wherein a second surface of the sixth lens has a point of inflection and satisfies Condition Equation 1:

$0.5<\Sigma T/f<1.7,$ <Condition Equation 1> wherein $\Sigma T$ is a total thickness of an optical system, and f is a focal distance of the entire optical system image pickup lens; and wherein the image pickup lens is configured to satisfy Condition Equation 3 such that respective aberrations of the fourth lens and the fifth lens are inhibited from being increased:

$1<f45/f<3,$ <Condition Equation 3> wherein f45 is a combined focal distance of the fourth lens and the fifth lens.

12. The image pickup lens according to claim 11, wherein the image pickup lens satisfies Condition equation 2:

$0.5<f1/f<1.5,$ <Condition Equation 2> wherein f1 is a focal distance of the first lens, and f is a focal distance of the entire optical system.

13. A camera module comprising:

an image pickup lens comprising a first lens to a sixth lens arranged in sequence from an object side to an image side, the first lens to the sixth lens each having refraction, and the second lens, the third lens, and the sixth lens each having negative refraction; wherein the first lens, the fourth lens, and the fifth lens each has positive refraction, wherein an object side surface of the third lens facing the object side has a radius of curvature greater than a radius of curvature of an image side surface of the third lens facing the image side, wherein an object side surface of the first lens has a convex shape, an image side surface of the first lens has a convex shape, an object side surface of the second lens has a convex shape, an image side surface of the second lens has a concave shape, the object side surface of the third lens has a concave shape in a paraxial region of the third lens, the image side surface of the third lens has a concave shape in the paraxial region of the third lens, an object side surface of the fourth lens has a convex shape in a paraxial region of the fourth lens, an image side surface of the fourth lens has a convex shape in the paraxial region of the fourth lens, an object side surface of the fifth lens has a concave shape, an image side surface of the fifth lens has a convex shape, an object side surface of the sixth lens has a convex shape in a paraxial region of the sixth lens, and an image side surface of the sixth lens has a concave shape in the paraxial region of the sixth lens, wherein the fourth lens and the fifth lens each has an index of refraction smaller than 1.7, and wherein an second surface of the sixth lens has a point of inflection;

a filter configured to selectively transmit light having passed through the image pickup lens, based on a wavelength; and a light receiving element configured to receive the light having passed through the filter;

wherein the image pickup lens is configured to satisfy Condition Equation 3 such that respective aberrations of the fourth lens and the fifth lens are inhibited from being increased:

$1<f45/f<3,$ <Condition Equation 3> wherein f45 is a combined focal distance of the fourth lens and the fifth lens, and f is a focal distance of the entire image pickup lens.

14. The camera module according to claim 13, wherein the light receiving element is an image sensor, and a horizontal and/or vertical length of a unit pixel of the image sensor is 2 μm or less.

* * * * *